May 14, 1940.                F. E. OILER                 2,201,009
              APPARATUS FOR PHOTOGRAPHING DOCUMENTS
                    Filed Jan. 3, 1939        4 Sheets-Sheet 1

INVENTOR
Frank E. Oiler.
BY
ATTORNEY

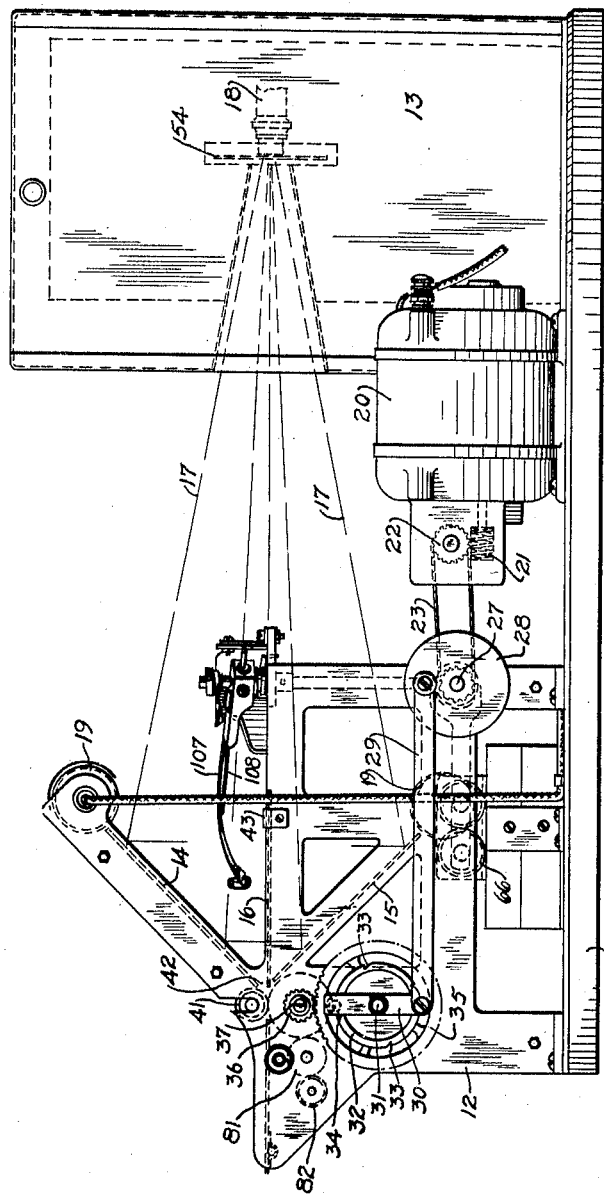

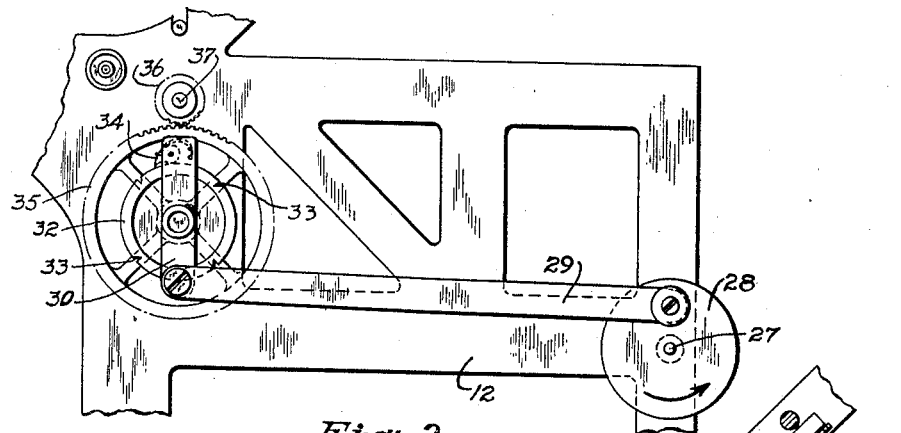
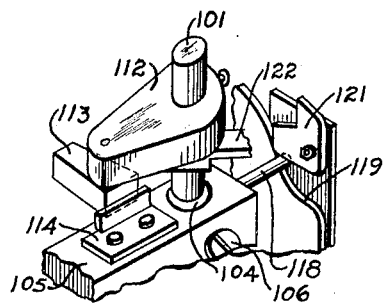
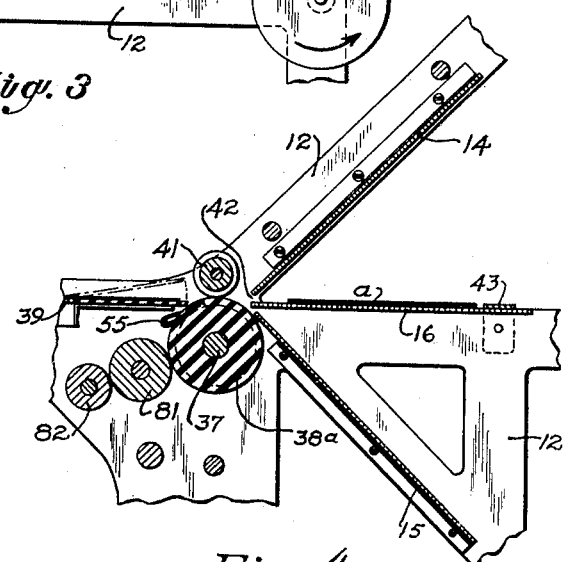
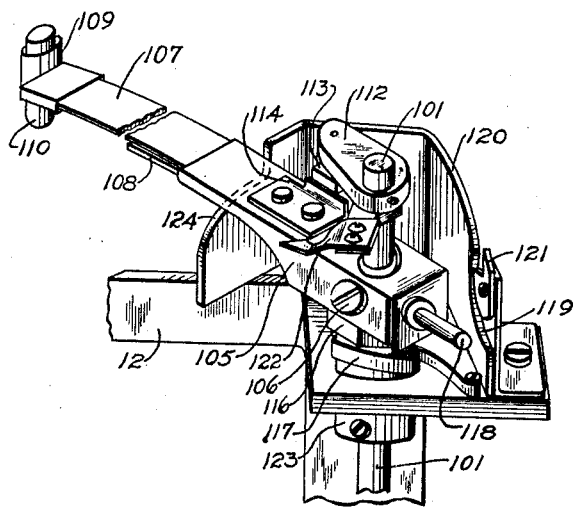
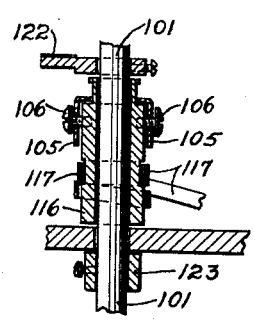

Patented May 14, 1940

2,201,009

UNITED STATES PATENT OFFICE 2,201,009

APPARATUS FOR PHOTOGRAPHING DOCUMENTS

Frank E. Oiler, Mount Vernon, N. Y.

Application January 3, 1939, Serial No. 249,142

11 Claims. (Cl. 88—24)

This invention relates to a machine or apparatus for making a photograph record of documents. The document may be any form of commercial paper, but the application has been specifically illustrated in connection with making a photograph record of bank checks which have to be photographed on both sides. The photograph record is made on a motion picture film preferably of the smaller size so that it can be preserved in small compass and is readily available for use by enlarging the photograph. It is necessary that both sides of the document be photographed on the same frame of the film so that the record appears complete in a single picture. The apparatus operates in cycles each of which includes three conditions:— the first condition places the check on a stationary transparent table to be photographed; the second condition manipulates the camera to take the photograph while the document is in the stationary position; and the third condition removes the check from its stationary position and from the apparatus to a filing tray, and the camera is operated to move the film to expose the next frame after the photograph has been taken.

One advantage of this mechanism resides in the fact that each cycle is complete in itself and the machine may be operated to photograph a single document by itself, or it may be operated to take photographs in succession as rapidly as the documents are fed to it. In each case, the document is always visible and can be observed by the operator as it follows through the process until it is delivered by the machine.

The photograph of the document is taken by its reflected image on a pair of angularly disposed mirrors. Between these mirrors a glass table is provided to receive the document and the edge of this table extends from the apex of the mirrors and in line with the lens of the camera, thus optically making available both sides of the document for photographic purposes. The document is fed to the paper table through a slot between the reflecting members at their adjacent edges—that is, the document is fed to the paper table from the back of the reflecting members. A feed roller is provided for feeding the document into position, and this roller makes one complete revolution in less than half of the cycle of operation, its speed is thereby increased and the document, even if of the character of a light paper check, is urged forward onto the paper table and against a stop by the initial momentum imparted to it by the roller.

The length of time of the exposure for taking a photograph is regulated by the aperture of the camera shutter, but the document remains stationary on the paper table for at least a quarter of the cycle of operation, and this time can be increased if necessary. An advantage is secured by the use of a comparatively long exposure in the operation of the apparatus as this enables a less expensive film to be used and also a less expensive lens in the camera for satisfactory results.

After the photograph is taken and during the last portion of the cycle of operation, a spring finger is rotated into engagement with the face of the check and through an escapement and retrieving spring this finger is released and slides the document off the paper table into the filing tray, which completes the operation.

The apparatus is operated by an electric motor which drives the main shaft, and which is connected by an electrically controlled clutch to the operating mechanism. This clutch is initially engaged by pressure on the paper stand where the paper is placed before it engages the feed roller. After the initial engagement of the clutch, it is maintained in engagement by the rotation of the drive shaft until one complete revolution has been made. At this point the clutch magnet is deenergized and the apparatus stops unless it is again operated by pressure on the paper stand. This apparatus permits of operation and will photograph the checks as rapidly as they can be fed to it, and for continuous operation it may be provided with a conveyor to feed the checks continuously but which is not shown in the drawings.

These and other objects of the invention will be more particularly understood from the following specification and the accompanying drawings, in which—

Figure 2 is a side elevation of the apparatus corresponding to Fig. 1;

Fig. 3 is an enlarged detail showing the intermittent driving mechanism between the main shaft and the feed roller;

Fig. 4 is a sectional detail showing the relation of the paper, the reflecting members, and the feed roller;

Fig. 5 is a perspective view of the operating mechanism for the discharging finger;

Fig. 7 is a vertical section of the universal mounting for the releasing finger shown in Fig. 5; and Fig. 8 is a perspective view of part of the mechanism of the releasing finger shown at right angles to the position in Fig. 5.

Figure 1:
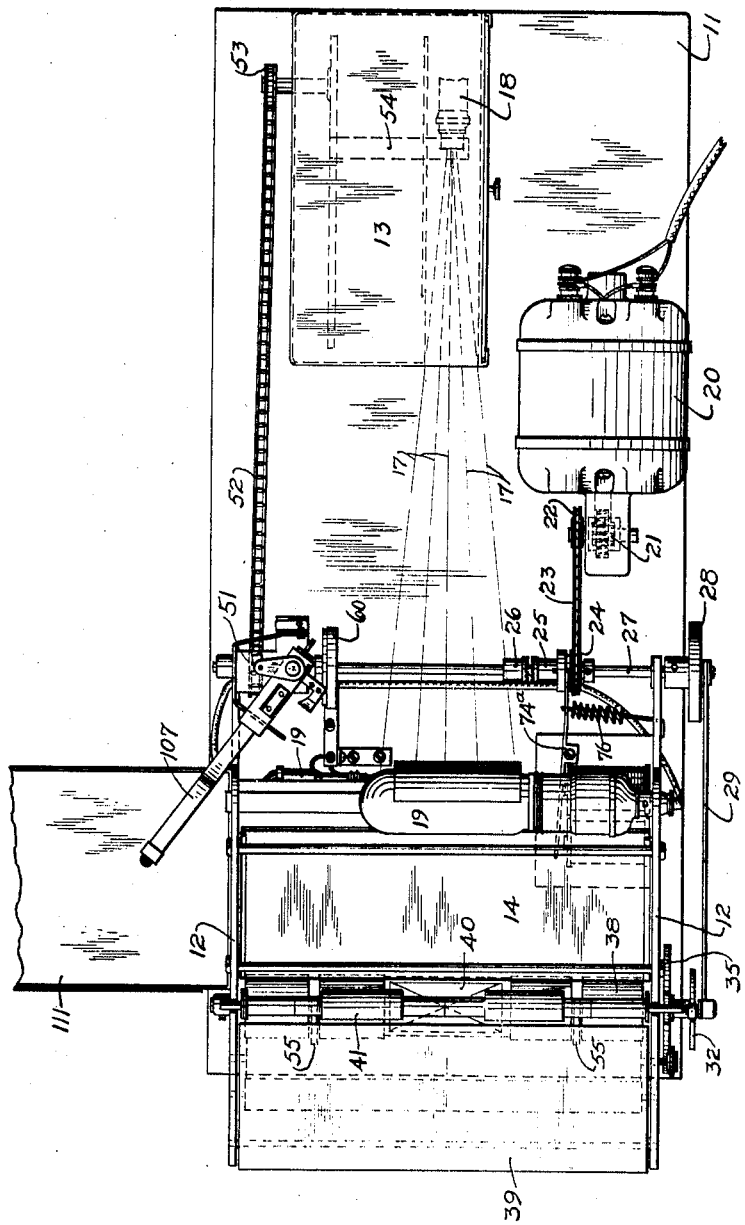
Figure 1 is a top plan view of the apparatus complete.

In the drawings, 11 is the base on which the apparatus is mounted, 12 represents a pair of side members mounted upon the base and constituting the frame of the apparatus for holding the document in the photographic position, and 13 is the camera which is of the usual commercial motion picture type and is not specifically detailed in this application. 14 is the upper mirror or reflecting member, 15 is the lower mirror, and 16 is the paper table which receives the document $a$ aligning with the stop 43, on top of the table. It will be observed that the light spread 17 of the lens 18 of the camera is reflected from the surfaces 14 and 15 according to the image of the document $a$ which is projected on 14 and 15 as produced by the illumination of lamps 19; a lamp is preferably provided for both sides of the table 16.

Figure 6:
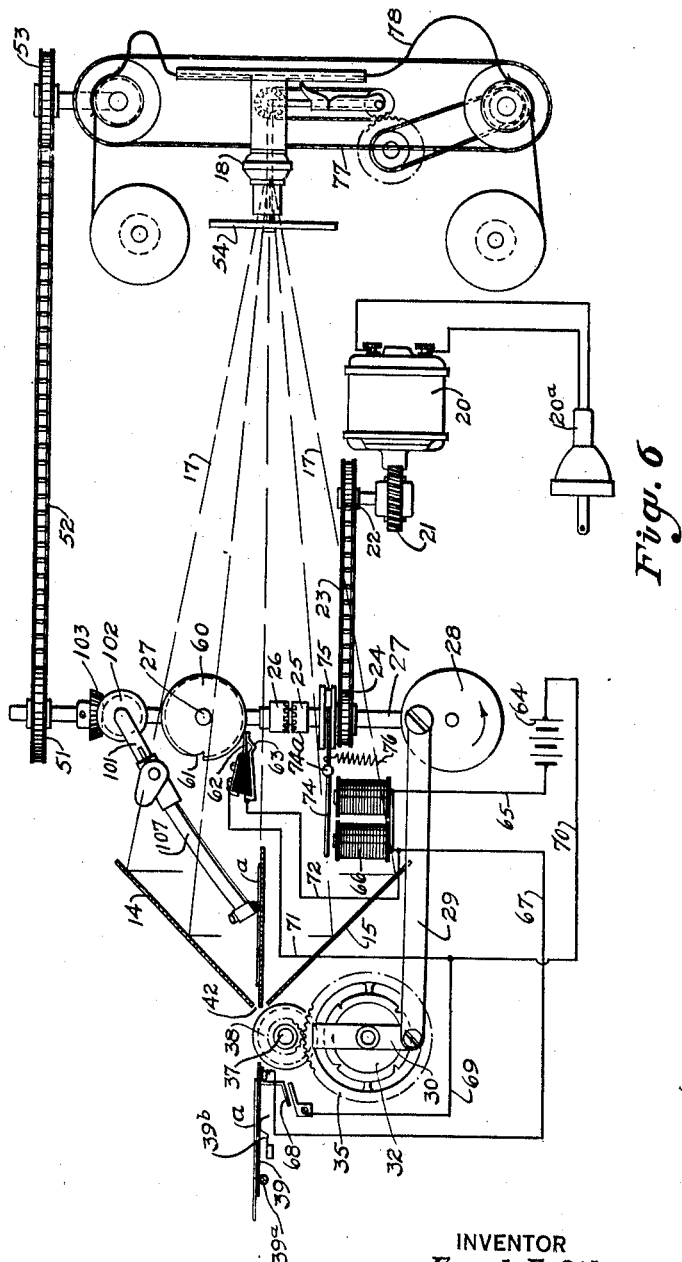
Fig. 6 is a diagram showing the general operation of the system.

A motor 20, Fig. 6 is operated from an electrical supply obtained from the plug 20$^a$ and through a suitable reduction gear 21, chain wheel 22, chain 23, gear 24, and the clutch member 25 is continuously rotated freely on shaft 27 at a lower speed than the speed of the motor. The main shaft 27 has rigidly mounted thereon the complementary clutch member 26 so that when the clutch members 25 and 26 are brought into engagement, the drive shaft 27 is rotated by the motor. This shaft carries on its outer end the crank disk 28 to which the connecting rod 29 is pivoted, and the opposite end of this rod pivots to the rocking lever 30, mounted on the axis of the ratchet wheel 32 and the gear wheel 35 attached to ratchet wheel 32. The ratchet wheel 32 is provided with four notches 33, Fig. 3, equally spaced on its circumference, and these notches are engaged by the detent 34 mounted on the rocking arm 30 so that as the upper end of this arm is rocked toward the left, the detent engages the ratchet and rotates 32 and 35. It will be observed that the crank 28, rotating in the direction of the arrow, will move the upper end of arm 30 toward the right when the connecting rod 29 is above the center of the crank, and it will move the arm 30 in the opposite direction when the rod 29 is below the center of the crank; the first operation moves the ratchet back a distance somewhat greater than the space between the notches 33, and the second operation reversing the movement of the upper arm engages the ratchet and moves the wheel 35 for a quarter of a turn corresponding to one turn of the main shaft 27 and this movement is imparted to the gear 35 during somewhat less than half the revolution of the main shaft, the remainder of the time the gear 35 remains stationary.

The gear 35 engages gear 38 in the ratio of four to one, so that a quarter turn of the gear 35 rotates the feed roller 38$^a$ mounted on shaft 37, one complete revolution after which it remains stationary until the cycle of operation is completed. Roller 41 rides by gravity upon the feed roller 38$^a$ and secures the necessary frictional engagement between the roller 38$^a$ and the document as it is fed to the machine. The paper support 39 receives the check $a$ which is fed between the rollers 41 and 38$^a$ through the slots 42 at the apex of the reflecting members 14 and 15 and onto the paper table 16 against the stop 43. It will be noted that since the roller 38$^a$ is rotated at comparatively high speed an impetus is given to the document to slide it across the table to engage the stop 43 and thereby uniformly position the document for photographic purposes. If the document requires further movement to position it on the photographic table, loose rubber bands may be provided, as indicated at 55, in recesses of the roller 38$^a$ so that the ends of these bands will force the inner edge of the paper through the slot 42 and at the same time these bands collapse freely into the groove in the roller to provide for the free movement of the latter.

The roller 38$^a$ may be used to imprint the document, as for instance the cancellation of a check. The printing characters may be applied to the roller at 40, Fig. 1, and the roller may be inked by roller 82, through roller 81, Fig. 4. As roller 38$^a$ makes one complete revolution for each document fed to the machine, the printing always appears on the same portion of the document.

A chain wheel 51 is mounted on shaft 27 and by chain 52 a chain wheel 53 operates the mechanism of the camera which intermittently operates the film 78 by the chain gear 77 and operates the shutter 54 in front of the lens 18. The shutter is provided with an aperture suitable for the time of exposure desired for taking the photograph. The camera mechanism is a commercial product.

The clutch member 25 is provided with a groove 75 for the lever 74 pivoted at 74$^a$. This lever is moved by the magnet 66 against the spring 76 to engage the clutch members 25 and 26 when the magnet is energized and the spring disengages this clutch immediately the magnet is de-energized. The paper stand 39 is pivoted at 39$^a$ and is retained in raised position by one or more springs 39$^b$. When a slight pressure is applied to the stand, it is deflected to close the circuit at 68. This establishes a circuit from magnet 66, through wire 65, battery 64, wire 70, wire 69, contact 68, and wire 67 back to magnet 66, thereby energizing the magnet and engaging the clutch members for the initial movement of the drive shaft 27. A cam 60 is provided on shaft 27 engaging the contact member 62, forcing this member into engagement with contact member 63 except when the notch 61 of the cam registers with 62 when the circuit between 62 and 63 is interrupted. This circuit is in multiple with the circuit controlled by 68 through a connection on wire 72 connecting to magnet 66, and wires 71 and 70, connecting to battery 64. Thus the operator when placing the document in the feed rollers depresses table 39 until shaft 27 moves the cam 60 to close the circuit between 62 and 63 and thereafter the circuit remains closed for a complete revolution of shaft 27, which corresponds with one cycle of operation of the machine, until the circuit is interrupted at 62—63 by notch 61 of cam 60.

The paper is discharged from the paper table by a discharge finger, as illustrated in Figs. 5, 7, and 8. This mechanism is operated by a vertical counter shaft 101 which, through the beveled gears 102 and 103, makes one revolution for each revolution of the drive shaft 27; a collar is provided at 123 on shaft 101 below the frame 12 to hold the shaft in position. A sleeve 116 is freely mounted on shaft 101 but is biased to a stop position where the arm 105 engages the cam member 124, as in Fig. 5, by the coil spring 117. The arm 105 is pivotally mounted at 106 to the sleeve 116 so that the finger 107, carried by the arm 105 and reinforced by spring 108, has a universal mounting being free to move vertically on the pivots 106. The shaft 101 has mounted on its upper end a crank arm 112 provided with an engaging block 113 which travels in the path of the barrier 114 secured to arm 105, with the result that as the shaft 101 is rotated the member 113 engages barrier 114 and thereby swings the arm 107 from the released position shown in Fig. 1 to the engaging position with the end of the arm in engagement with the document. The end is provided with a sleeve 109 carrying a rubber tip 110 to provide suitable frictional engagement between the finger and the document.

The cam member 124 is provided with a cam surface 119 which is engaged by the projecting member 118 of the arm 105 with the result that as the finger is brought into the engaging position, the rise of this cam lowers the arm 105 on its pivots 106 and thereby disengages the barrier 114 from 113 thus providing an escapement which becomes effective as soon as the point 110 has been brought into engagement with the document, and the retrieving spring 117 immediately swings the finger and the document off the paper table.

If the pressure on the point 110 should become excessive so that it would resist the operation of the retrieving spring to discharge the document, means is provided for easing this pressure so that the retrieving spring will become effective. This comprises the pivoted cam 121 mounted on 124 and under which the projecting end 118 rides. The shaft 101 is provided with an arm carrying a spring wiping member 122 which rides over the top of 121 and tilts this member forward so that as it bears upon the end of 118 it thereby reduces the pressure on the engaging point 110 and enables the finger to be operated by the retrieving spring.

The general construction of the apparatus shown and described admits of considerable variation to adapt it to documents of different sizes and weights and to adapt it to different photographic arrangements, and the apparatus may be used to photograph single documents by a plate camera, if desired. The reflecting mirrors 14—15 and the glass table 16 are readily replaceable.

Feeding the documents from the back of the mirrors and removing the documents at right angles to the direction of feed, materially helps to speed up the operation of the system as the documents to be fed to the machine are out of the field of vision of the camera and can be held in readiness as soon as the previous document has been removed. The apparatus for removing the document is mounted to one side and out of the plane of vision of the photographic system and it only comes into use momentarily at the end of the cycle.

What is claimed is:

1. In an apparatus for simultaneously photographing both sides of a document, a pair of angularly related image reflecting members having a slot between their adjacent edges, a fixed transparent table having its edge aligned with said slot and spaced between said members whereby the document may be inserted through said slot upon said table, means for illuminating both sides of said table, a mechanism for photographing the image of the document as reflected by said members, an oscillating finger for removing the document from the table in a direction at right angles to the direction in which it was placed upon the table, and means operatively connecting said oscillating finger with said mechanism.

2. In an apparatus for simultaneously photographing both sides of a document, a pair of angularly related image reflecting members having a slot between their adjacent edges, a fixed transparent table having its edge aligned with said slot and spaced between said members, means for illuminating both sides of the table, a drive shaft, a roller for feeding the document through said slot, means operatively connecting said roller with said drive shaft, an oscillating finger for removing the document, means operatively connecting said finger with said drive shaft, a camera for photographing the document as reflected by said members, and means for operating said camera by said drive shaft.

3. In an apparatus for simultaneously photographing both sides of a document, a pair of angularly related image reflecting members having a slot between their adjacent edges, a fixed transparent table having its edge aligned with said slot and spaced between said members, means for illuminating both sides of the table, a drive shaft for operating said apparatus for one cycle of operation for each revolution of said shaft, a feed roller for feeding the document to said table, a drive mechanism connecting said feed roller with said shaft to rotate said roller during the initial revolution of said shaft only, a camera having a shutter for photographing the images of said document as reflected by said members, means for operating said shutter by said drive shaft when the document is on the table, and an oscillating finger operated by said drive shaft for removing the document as the final operation.

4. In an apparatus for simultaneously photographing both sides of a document, a pair of angularly related image reflecting members, a fixed transparent table spaced between said members, means for illuminating both sides of the table a drive shaft for operating said apparatus for one cycle of operation for each revolution of said shaft, a feed roller for feeding the document to said table, a drive mechanism connecting said roller with said shaft to rotate said roller at a higher speed than said shaft during part of the revolution of said shaft only, a camera having a shutter for photographing the images of the document as reflected by said members, means for operating said shutter by said drive shaft when the document is on the table, and means operated by said shaft for removing said document as the final operation of the cycle.

5. In an apparatus for simultaneously photographing both sides of a document, a pair of angularly related image reflecting members, a fixed transparent table spaced between said members, means for illuminating both sides of the table, a drive shaft for operating said apparatus for one cycle of operation for each revolution of said shaft, said operation comprising a feed roller for feeding the document to the table in the first part revolution of the shaft, a camera having a shutter for photographing the images of the document as reflected by said members, said drive shaft controlling said shutter to take the photograph during approximately one-quarter revolution of said shaft, and means operated by said shaft during its final revolution for removing the document from said table.

6. In an apparatus for simultaneously photographing both sides of a document, a pair of angularly related image reflecting members having a slot between their adjacent edges, a fixed transparent table having its edge aligned with said slot and spaced between said members, means for illuminating both sides of the table, a drive shaft causing one cycle of operation of the apparatus for each revolution, a roller having marking characters thereon for feeding the document through said slot, means operatively connecting said roller with said shaft to make one revolution for the first part revolution on said shaft only, a camera having a shutter for photographing the images of said document as reflected by said members, means for operating said shutter by said drive shaft when the document is on the table, and means operated by said shaft during its final operation of the cycle for removing the document from the table.

7. In an apparatus for simultaneously photographing both sides of a document, a pair of angularly related image reflecting members, a fixed transparent table for receiving the document spaced between said members, means for illuminating both sides of said table, a camera having a shutter for photographing the images of the document as reflected by said members, a spring finger having a shoe engaging the document, a counter shaft for operating said finger, a universal connection between said counter shaft and finger, a spring for retrieving said finger and removing the document, a cam for releasing said finger in the retrieving position, a main drive shaft, and means operatively connecting said shutter with said drive shaft to take the photograph, and means connecting said counter shaft with said drive shaft to remove the document after the photograph is taken.

8. In an apparatus for photographing a document, a fixed table for receiving the document, a spring finger having a shoe engaging the document to remove the document from the table, a counter shaft, a universal mounting for mounting said finger on said shaft to rotate free of said shaft, a spring for retrieving said finger, a detent on said shaft engaging said finger to rotate with said shaft, a cam for releasing said finger from said detent when the document is to be removed, a drive shaft operatively connected with said counter shaft, a camera having a shutter for photographing the document and means operatively connecting said shutter with said drive shaft.

9. In an apparatus for photographing a document, a fixed table for receiving the document, a roller for delivering the document to said table, a drive shaft having a crank, a wheel having notches spaced 90° apart, an arm with a detent engaging said notches, means operatively connecting said arm with said crank to move said arm to engage one of said notches for each revolution of the crank, gears connecting said roller with said notched wheel to cause the roller to make one revolution for each quarter revolution of said wheel, a camera having a shutter for photographing the document, and means connecting said shutter with said shaft to open the shutter after the document has been placed on the table.

10. In an apparatus for photographing a document, a fixed table for receiving the document, a spring finger having a shoe engaging the document to remove the document from the table, a counter shaft, a universal mounting for mounting said finger on said shaft to rotate free of said shaft, a spring for retrieving said finger, a detent on said shaft engaging said finger to rotate with said shaft, a cam for releasing said finger from said detent when the document is to be removed, a pivoted member engaging said finger when depressed to raise the finger from the table, and means operated by said counter shaft for depressing said member, a drive shaft operatively connected with said counter shaft, a camera having a shutter for photographing said document, and means operatively connecting said shutter with said drive shaft.

11. In an apparatus for simultaneously photographing both sides of a document, a pair of angularly related image reflecting members having a slot between their adjacent edges, a fixed transparent table having its edge aligned with said slot and spaced between said members whereby the document may be inserted through said slot upon said table, means for illuminating both sides of said table, a camera having a shutter for photographing the image of the document as reflected by said members, and a mechanism operating in cycles, each cycle placing a single document on said table, operating the camera shutter to photograph the document and operating a finger against a spring to remove the document from the table when the finger is released and while the document remains in sight of the operator.

FRANK E. OILER.